(12) United States Patent
Kertes

(10) Patent No.: US 7,077,414 B1
(45) Date of Patent: Jul. 18, 2006

(54) SELF PROPELLED SCOOTER

(76) Inventor: Jon Paul Kertes, 10970 Amery Ave., South Gate, CA (US) 90280

( * ) Notice: Subject to any disclaimer, the term of this patent is extended or adjusted under 35 U.S.C. 154(b) by 0 days.

(21) Appl. No.: 10/876,731

(22) Filed: Jun. 25, 2004

Related U.S. Application Data

(60) Provisional application No. 60/482,746, filed on Jun. 26, 2003.

(51) Int. Cl.
*B62M 1/10* (2006.01)

(52) U.S. Cl. .................. 280/212; 280/214; 280/87.041

(58) Field of Classification Search ............... 180/65.1, 180/65.3, 65.6, 219–221, 205, 180, 181; 280/87.041–87.043, 14.21, 200, 212, 214, 280/215
See application file for complete search history.

(56) References Cited

U.S. PATENT DOCUMENTS

| | | | | |
|---|---|---|---|---|
| 3,992,029 A | * | 11/1976 | Washizawa et al. | 280/221 |
| 4,319,760 A | * | 3/1982 | Romano | 280/11.115 |
| 4,861,054 A | * | 8/1989 | Spital | 280/221 |
| 5,016,726 A | * | 5/1991 | Metcalf | 280/243 |
| 5,020,621 A | * | 6/1991 | Martin | 180/181 |
| 5,048,632 A | * | 9/1991 | Battel | 180/181 |
| 5,224,719 A | * | 7/1993 | Goodspeed | 280/11.115 |
| 5,310,202 A | * | 5/1994 | Goodspeed | 280/221 |
| 5,388,659 A | * | 2/1995 | Pepe | 180/219 |
| 6,227,324 B1 | * | 5/2001 | Sauve | 180/228 |
| 6,564,894 B1 | * | 5/2003 | Ho | 180/228 |
| 6,848,527 B1 | * | 2/2005 | Nelson | 180/181 |

* cited by examiner

*Primary Examiner*—Lesley D. Morris
*Assistant Examiner*—L. Lum
(74) *Attorney, Agent, or Firm*—Kenneth L Tolar

(57) ABSTRACT

The present invention relates to a scooter that is self propelled with a uniquely designed spring winding propulsion system. Using a system of interrelated gears and sprockets, the propulsion system is automatically rewound as a user manually propels the scooter. Accordingly, when the propulsion system is sufficiently rewound, a release button transfers energy contained within the wound springs to a rear wheel thereby automatically propelling the scooter.

3 Claims, 3 Drawing Sheets

SELF PROPELLED SCOOTER

CROSS REFERENCE TO RELATED APPLICATIONS

This application is entitled to the benefit of provisional application No. 60/482,746 filed on Jun. 26, 2003.

BACKGROUND OF THE INVENTION

1. Technical Field of the Invention

The present invention relates to a self propelled scooter employing a uniquely designed spring-loaded propulsion system that is automatically rewound by manual propulsion of the scooter.

2. Description of the Prior Art

The scooter has been a popular child's toy for decades. The primary disadvantage associated with a scooter, however, is that it must be manually propelled with one's foot. The present invention overcomes this disadvantage by providing a scooter having a uniquely designed spring-loaded propulsion system that is rewound as the child manually pushes the scooter. The resulting stored energy in the wound springs can be released with the press of a button to further propel the scooter automatically.

SUMMARY OF THE INVENTION

The present invention relates to a self propelled scooter. The device comprises a deck on which a user stands having a transmission housing mounted on the lower surface thereof. Within the transmission housing is a series of gears. A chain encompasses the gears as well as a gear on a front wheel. One of the gears winds a spring mechanism enclosed within a casing. On an end of the casing is a release gear and attached transmission drive sprocket. A spring biased pawl rests against the gear preventing its rotation.

The device also includes a transmission assembly including a drive gear with a belt pulley adjacent thereto. A belt encompasses the belt pulley and a pulley mounted on a rear wheel. A chain encompasses the transmission drive sprocket and the pulley drive gear. The pulley drive gear is attached to a drive disc having a plurality of spring biased engagement members peripherally mounted thereon. A hub surrounds the drive disc and is fixedly connected to the belt pulley. Pockets are peripherally positioned within the hub for selectively receiving the engagement members.

A release lever is mounted on the scooter handle and can manipulate the spring loaded pawl via a cable. Accordingly, manipulating the lever releases the pawl allowing the wound springs to propel the transmission drive sprocket resulting in rotation of the pulley drive gear and drive disc. The engagement members on the drive disc extend to seat within the hub pockets to effect simultaneous rotation of the belt pulley thereby driving the scooter rear wheel. As the pulley drive gear slows, the engagement members disengage allowing the drive disc to idle.

It is therefore an object of the present invention to provide a scooter that is self propelled.

It is another object of the present invention to provide a scooter having a uniquely designed spring wound propulsion means that is automatically rewound as the scooter is manually propelled.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
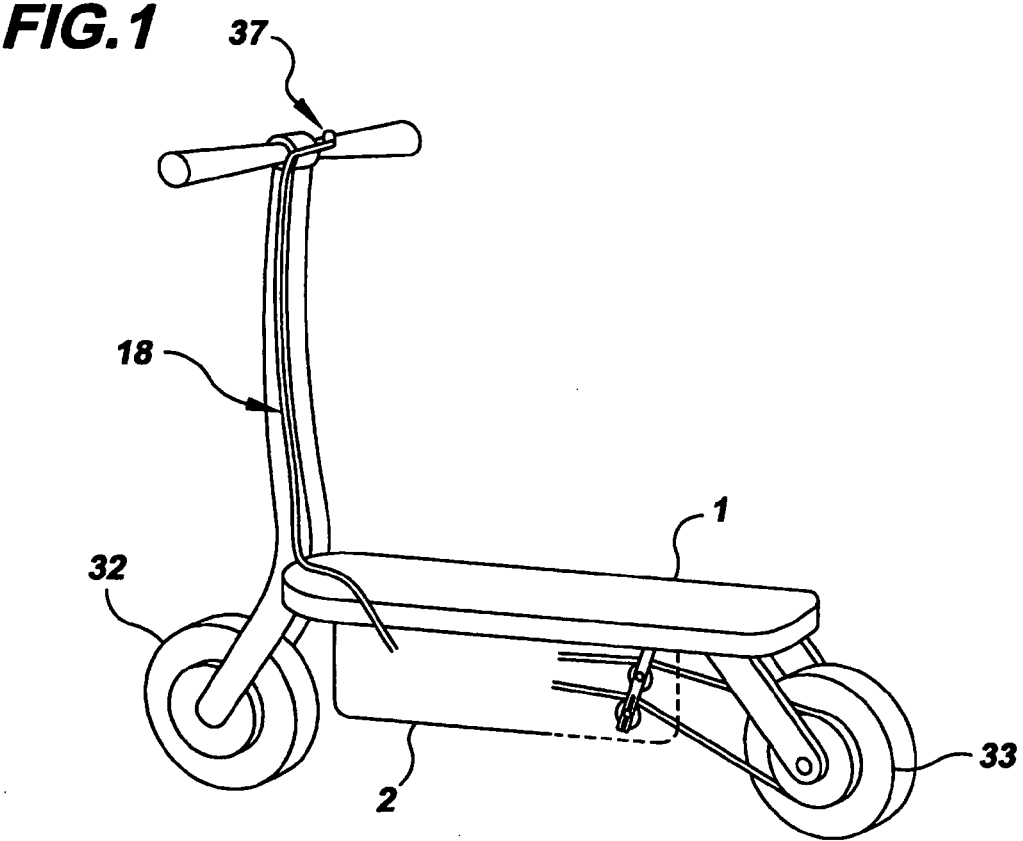
FIG. 1 is a perspective view of the scooter according to the present invention.
Figure 2:
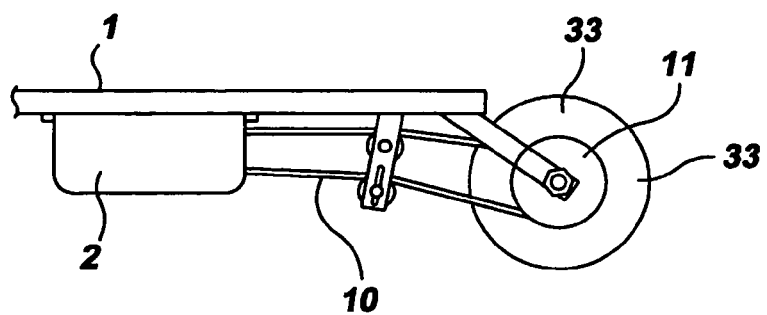
FIG. 2 is a side, cross-sectional view of the scooter.
Figure 3:
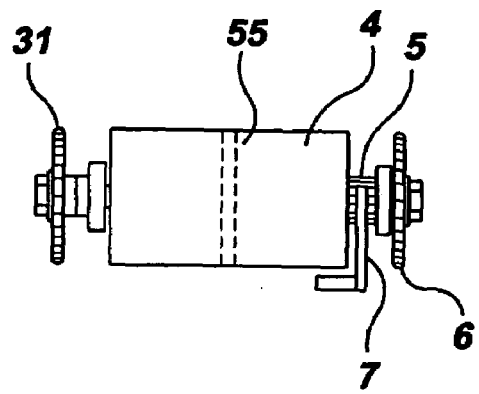
FIG. 3 is a detailed view of the spring winding propulsion means.
Figure 4:
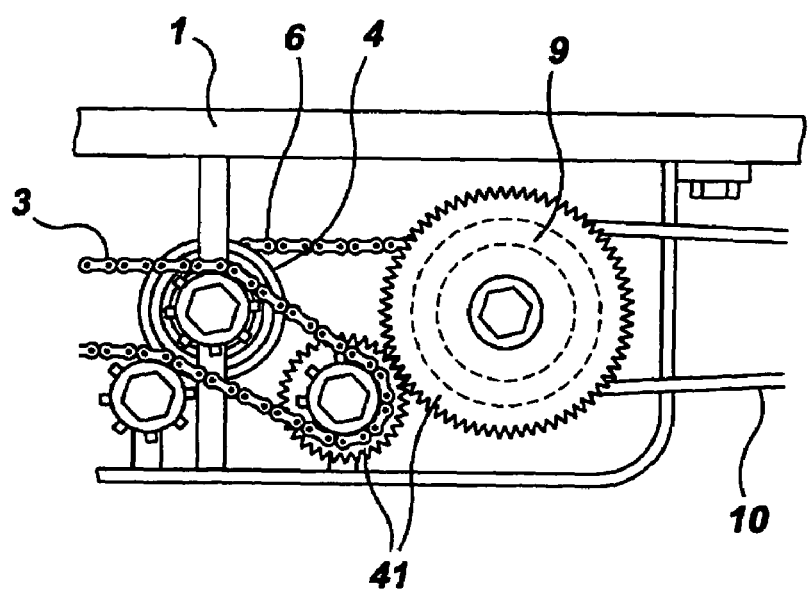
FIG. 4 is a detailed, cross-sectional view of the transmission housing interior.
Figure 5:
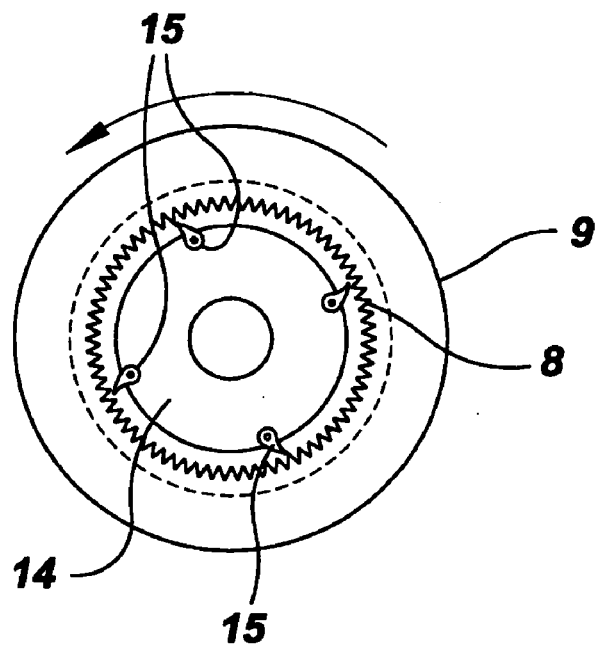
FIG. 5 is a detailed view of the drive disc and belt pulley assembly.
Figure 6:
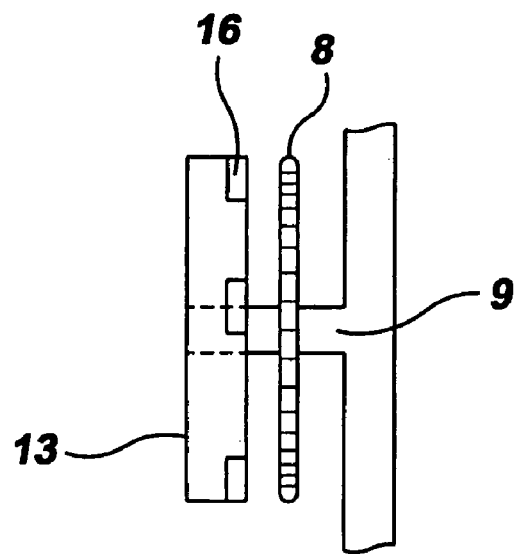
FIG. 6 is a side sectional view of the hub, pulley drive gear and belt pulley.

The present invention relates to a self propelled scooter. The device comprises a scooter deck 1 having an upper surface on which a user stands and a lower surface having a transmission housing 2 mounted thereon. The deck includes a front wheel 32 and a rear wheel 33 allowing the scooter to roll on an underlying surface. Within the transmission housing is a series of gears 41 encompassed by a chain 3; the chain also encompasses a gear positioned on the front wheel. Received within the housing is a casing 4 having a plurality of torsional springs 55 positioned therein. A winding gear 31 is attached to a side of the casing and is operably connected with the springs via a clutch mechanism. On an opposing end of the casing is a release gear 5 and an attached transmission drive sprocket 6. A spring biased pawl 7 rests against the release gear preventing rotation of the drive sprocket 6.

The device also includes a transmission assembly including a drive gear 8 with a belt pulley 9 adjacent thereto. A belt 10 encompasses the belt pulley and a pulley 11 mounted on the rear wheel allowing the belt pulley to drive the rear wheel. A chain 12 encompasses the transmission drive sprocket 6 and the pulley drive gear 8. The pulley drive gear 8 is attached to a drive disc 14 having a plurality of pivotal, spring-biased engagement members 15 peripherally mounted thereon. The drive gear 8 and drive disc rotate 14 in unison. A hub 13 is superimposed on the drive disc and includes a plurality of pockets 16 positioned therein for selectively receiving the engagement members. The hub is fixedly attached to the belt pulley such that they rotate in unison.

When the rotational speed of the disc exceeds that of the belt pulley, and thus that of the hub, the engagement members engage the pockets to effect simultaneous rotation of the hub and drive pulley. When the rotational speed of the drive disc is less than that of the drive pulley and thus the hub, the engagement members are disengaged from the pockets allowing the drive disc to idle relative to the drive pulley so that manual propulsion of the scooter rewinds the torsional springs.

The scooter includes a handle having a release lever 37 mounted thereon that is connected to the spring-loaded pawl via a cable 18. Accordingly, manipulating the lever releases the pawl allowing the wound spring to propel the transmission drive sprocket resulting in rotation of the pulley drive gear and the drive disc. The engagement members then extend to seat within the hub pockets to effect simultaneous rotation of the drive pulley thereby driving the scooter rear wheel. As the pulley drive gear loses inertia and therefore slows, the engagement members are released from the pockets allowing the drive pulley to rotate independently of the drive disc and pulley drive gear while a rider manually propels the scooter to rewind the spring. Additionally, the clutch mechanism releases the winding gear from the springs as the spring is unwound.

The above described device is not limited to the exact details of construction and enumeration of parts provided herein. Furthermore, the size, shape and materials of construction can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The invention claimed is:

1. A self propelled scooter comprising:
   a deck providing a surface on which a user stands, said deck mounted on a front wheel and a rear wheel;
   a winding gear;
   a wheel gear positioned on one of said wheels;
   a chain encompassing said winding gear and said wheel gear;
   a torsional spring attached to said winding gear whereupon rotation of said winding gear in a predetermined direction winds said spring;
   a release gear secured to said spring;
   a transmission drive sprocket secured to said release gear;
   a drive gear;
   a chain encompassing said drive gear and said transmission drive sprocket;
   a drive pulley attached to said drive gear;
   means for selectively effecting simultaneous rotation of said drive pulley and said drive gear;
   a pulley mounted on one of said wheels;
   a belt encompassing said drive pulley and said rear wheel pulley.

2. The scooter according to claim 1 further comprising:
   a spring-biased pawl engaging said release gear;
   a release lever operably connected to said release gear via a cable whereupon activation of said release lever disengages said pawl from said release gear allowing said release gear and said transmission drive sprocket to be rotated by the force applied thereto by said torsional spring.

3. The scooter according to claim 2 wherein said means for selectively effecting simultaneous rotation of said drive pulley and said drive gear comprises:
   a drive disc fastened to said drive gear, said drive disc having a plurality of pivotal engagement members peripherally attached thereto;
   a hub surrounding said drive disc and attached to said drive pulley, said hub including a plurality of pockets formed therein whereby rotation of said drive disc at a predetermined speed positions said engagement members within said pockets to effect simultaneous rotation of said drive disc and said pulley.

* * * * *